(12) United States Patent
Dhuyvetter et al.

(10) Patent No.: US 9,949,500 B2
(45) Date of Patent: Apr. 24, 2018

(54) CONSUMPTION-REGULATED FEED BLOCK

(71) Applicant: Ridley USA Inc., Mankato, MN (US)

(72) Inventors: Dan Dhuyvetter, North Mankato, MN (US); Chunjiang Fu, St. Peter, MN (US); Mark Allen Robbins, Beulah, WY (US)

(73) Assignee: Ridley USA Inc., Mankato, MN (US)

( * ) Notice: Subject to any disclaimer, the term of this patent is extended or adjusted under 35 U.S.C. 154(b) by 0 days.

(21) Appl. No.: 15/421,942

(22) Filed: Feb. 1, 2017

(65) Prior Publication Data

US 2017/0143007 A1 May 25, 2017

Related U.S. Application Data

(63) Continuation of application No. 14/745,647, filed on Jun. 22, 2015, now Pat. No. 9,591,869.

(51) Int. Cl.

| | |
|---|---|
| *A23L 1/20* | (2006.01) |
| *A23K 50/10* | (2016.01) |
| *A23K 40/20* | (2016.01) |
| *A23K 10/30* | (2016.01) |
| *A23K 20/174* | (2016.01) |
| *A23K 20/147* | (2016.01) |
| *A23K 20/158* | (2016.01) |
| *A23K 20/10* | (2016.01) |
| *A23K 20/24* | (2016.01) |
| *A23K 20/20* | (2016.01) |
| *A23K 40/25* | (2016.01) |
| *A23K 10/40* | (2016.01) |

(52) U.S. Cl.
CPC ............. *A23K 50/10* (2016.05); *A23K 10/30* (2016.05); *A23K 10/40* (2016.05); *A23K 20/10* (2016.05); *A23K 20/147* (2016.05); *A23K 20/158* (2016.05); *A23K 20/174* (2016.05); *A23K 20/24* (2016.05); *A23K 20/30* (2016.05); *A23K 40/20* (2016.05); *A23K 40/25* (2016.05)

(58) Field of Classification Search
CPC .................................. A23K 10/40; A23K 50/10
USPC .............................. 426/1, 801, 635, 640, 648
See application file for complete search history.

(56) References Cited

U.S. PATENT DOCUMENTS

| | | |
|---|---|---|
| 2,707,151 A | 4/1955 | Martin |
| 3,246,336 A | 4/1966 | Baribo et al. |
| 3,532,503 A | 10/1970 | Kviesitis et al. |
| 4,016,296 A | 4/1977 | DeSantis |

(Continued)

OTHER PUBLICATIONS

International Search Report and Written Opinion issued in corresponding International Patent Application No. PCT/US16/31966 dated Oct. 24, 2016 (10 pages).

(Continued)

*Primary Examiner* — Helen F Heggestad
(74) *Attorney, Agent, or Firm* — Kilyk & Bowersox, P.L.L.C.; Valerie Calloway

(57) ABSTRACT

A consumption-regulated feed block for controlled consumption of animal feed, comprises a mass of controlled feed material, the consumption of which is to be controlled, in compressed block, chemical block or hybrid block form; and an intake control matrix of low moisture block material positioned in the controlled feed material and forming consumption control pockets to regulate consumption of the controlled feed material by requiring an animal to consume by licking portions of low moisture block material in order to consume controlled feed material in an adjacent consumption control pocket.

20 Claims, 12 Drawing Sheets

(56) References Cited

U.S. PATENT DOCUMENTS

| | | | |
|---|---|---|---|
| 4,027,043 | A | 5/1977 | Schroeder et al. |
| 4,749,578 | A | 6/1988 | Benton et al. |
| 5,236,717 | A | 8/1993 | Vinci |
| 5,622,739 | A | 4/1997 | Benton et al. |
| 6,168,803 | B1 | 1/2001 | Harris et al. |
| 6,244,217 | B1 | 6/2001 | Robbins et al. |
| 6,337,097 | B1 | 1/2002 | Sun et al. |
| 6,390,924 | B1 | 5/2002 | Yoshida et al. |
| 6,561,133 | B2 | 5/2003 | Robbins |
| 6,561,787 | B2 | 5/2003 | Sun et al. |
| 6,726,941 | B2 | 4/2004 | Ethington, Jr. et al. |
| 6,777,019 | B1 | 8/2004 | Thornberg |
| 6,793,947 | B2 | 9/2004 | Bachmeier |
| 2004/0244602 | A1 | 12/2004 | Labruno et al. |
| 2005/0064073 | A1 | 3/2005 | Paluch et al. |
| 2009/0110778 | A1 | 4/2009 | Muscroft et al. |
| 2012/0315362 | A1 | 12/2012 | Dale et al. |
| 2014/0272002 | A1 | 9/2014 | Fu et al. |
| 2015/0327578 | A1 | 11/2015 | Burr et al. |
| 2016/0366907 | A1 | 12/2016 | Dhuyvetter et al. |

OTHER PUBLICATIONS

Feed Manufacturing Technology V, Schofield, E. K. et al., American Feed Industry Association, Arlington, VA, Chapter 29, pp. 306-309, 2005.

Drouillard, J., "Block Supplements", Liquid Feed Symposium, pp. 87-89, 1998.

International Preliminary Report on Patentability issued in corresponding International Patent Application No. PCT/US16/31966 dated Dec. 26, 2017 (7 pages).

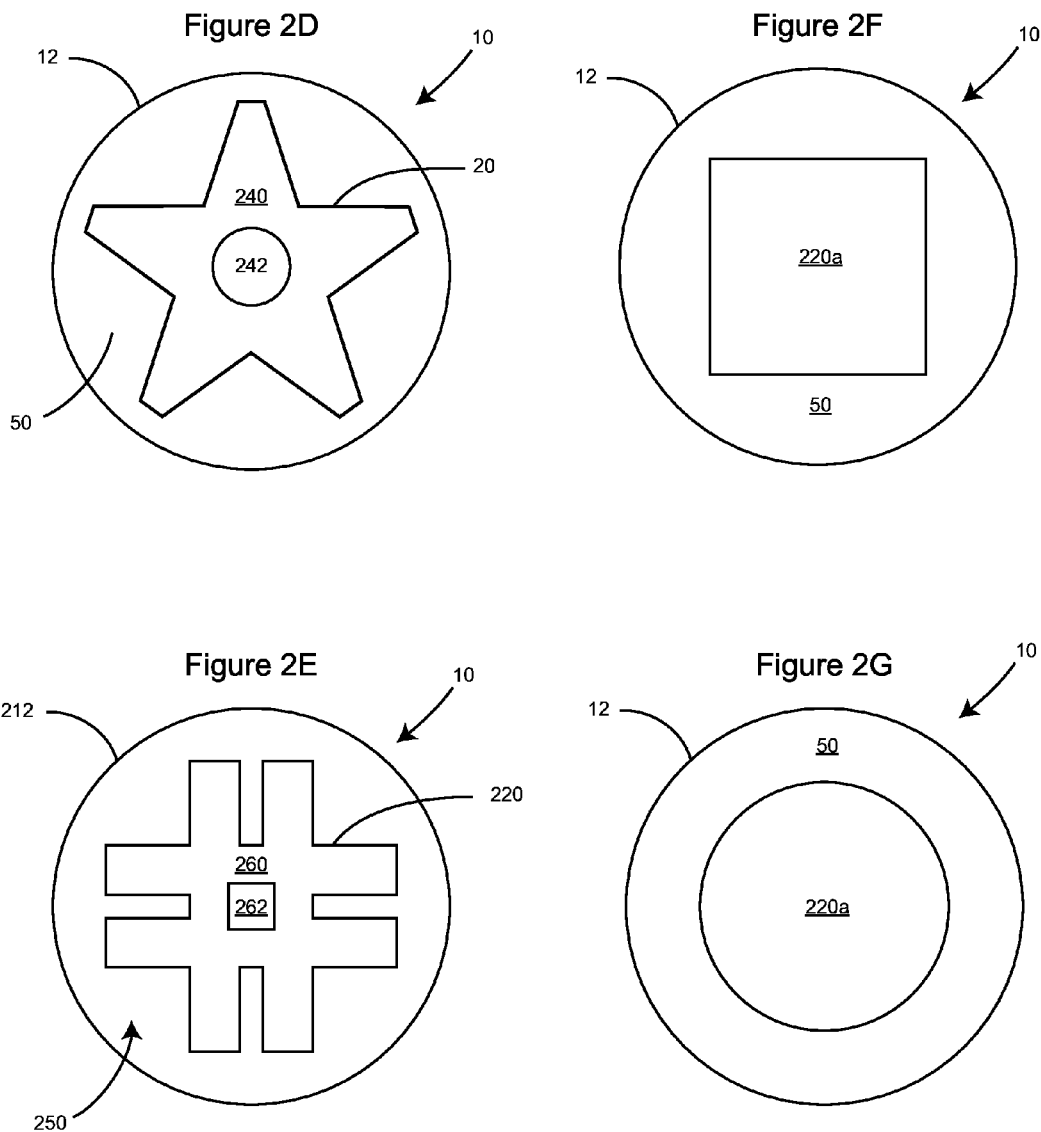

Figure 4A
Figure 4B
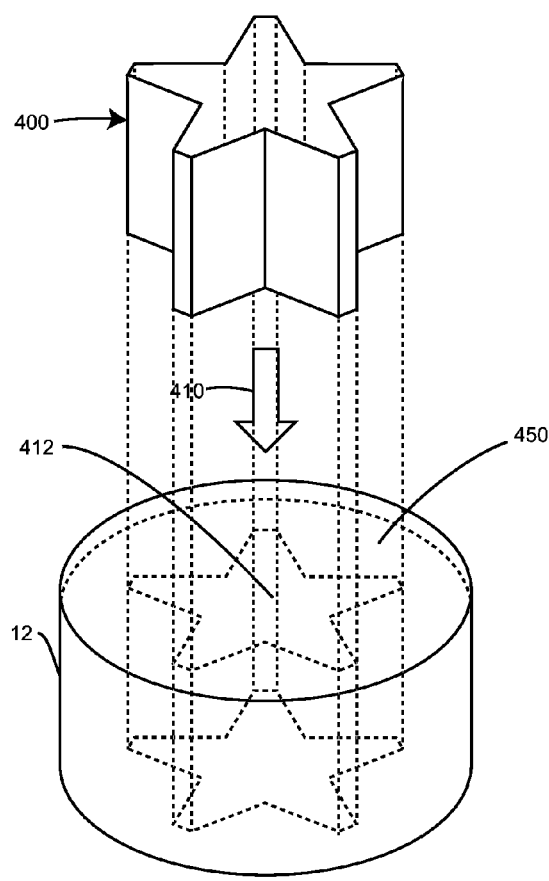
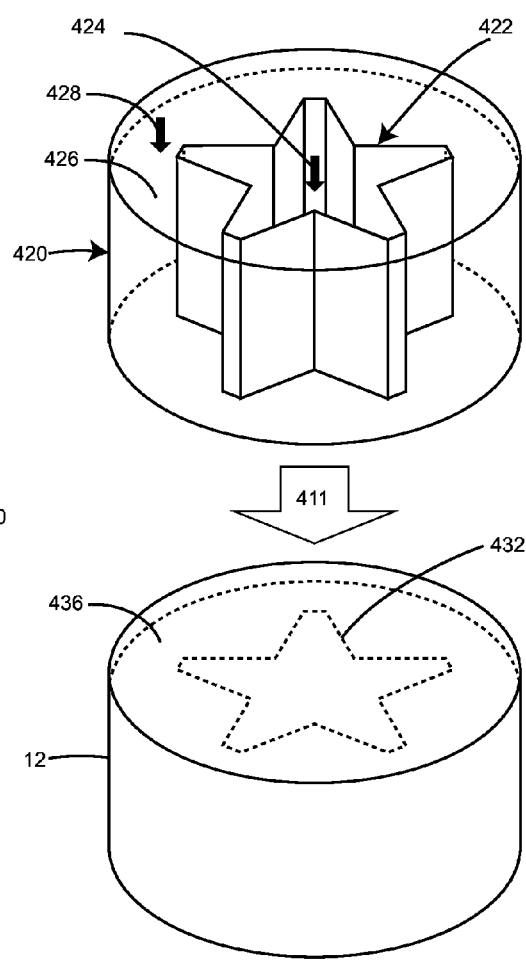

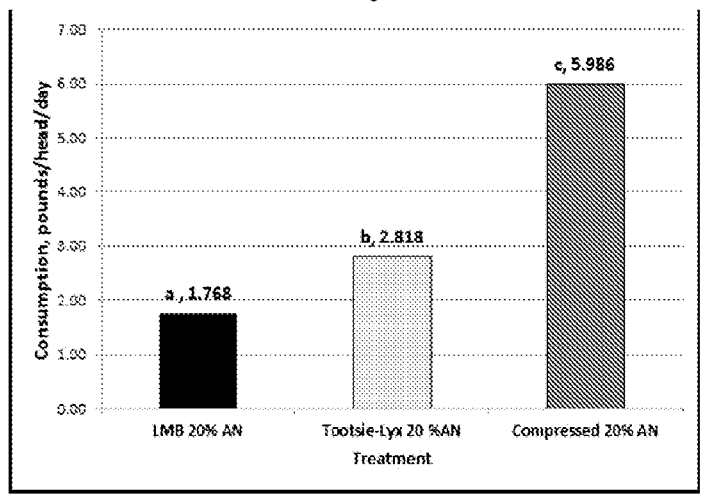
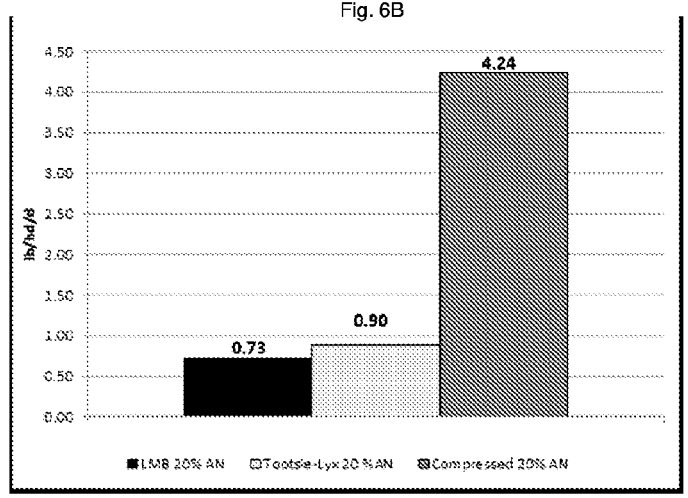
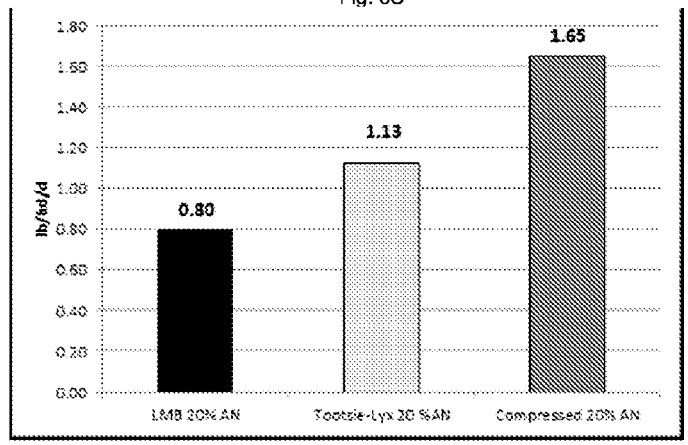

CONSUMPTION-REGULATED FEED BLOCK

CROSS-REFERENCE TO RELATED APPLICATION(S)

The present application is a continuation application of U.S. patent application Ser. No. 14/745,647, filed Jun. 22, 2015, now allowed, which is incorporated herein by reference in its entirety.

FIELD OF THE INVENTION

The present invention relates to consumption-regulated feed blocks used to deliver feed supplements and other ingestible substances to animals.

BACKGROUND OF THE INVENTION

Low moisture feed blocks for animals made by dehydrating molasses and adding special nutritional elements and other ingredients have become widely used. Such blocks are generally highly palatable and thus attract animals, permitting the blocks to serve as a delivery vehicle for feed supplements or other feed elements provided on an ad libitum consumption basis. They also may have a consumption regulating feature, in that they generally must be consumed by licking, rather than in bites, which slows ingestion and controls consumption. The combination of attraction and regulated consumption also helps to hold grazing animals in locations near the blocks. See, e.g., U.S. Pat. Nos. 6,244,217; 6,390,024 and 6,561,133.

As a result of these qualities, low moisture blocks have become widely used in many animal feed situations with many different ingredient formulations. However, some forms of feed supplements or mineral supplements are best or most conveniently formulated in a chemical block or compressed block form rather than in low moisture block form. These forms generally do not have the precision in limiting consumption, and they may be more or less palatable than the typical low moisture block, which is generally formulated to be highly palatable.

U.S. Pat. No. 5,622,739 to Benton shows a feed block for improved mineral delivery that has a mineral supplement provided as an inner cylindrical block or container embedded within a surrounding shell that consists primarily of the dehydrated molasses that is common in low moisture blocks. This is described in Benton's abstract as follows:

"An improved feed block provides discrete portions of mineral supplement and feed supplement in the same feed block. The mineral supplement is provided as an inner package that is surrounded by a shell of feed supplement such as a dehydrated molasses feed supplement. By so providing the two different supplements, the amount of consumption of each can be accurately controlled. Moreover, different feed blocks can be tailored depending on the desired ratio between the two different supplements."

The Benton structure and mode of consumption are described in Benton's Summary of the Invention:

"An improved feed block for livestock including an improved system for delivering minerals to the livestock is provided by the present invention. According to the invention, an inner block or edible container of granular mineral supplement is provided within an outer shell of feed supplement such as a dehydrated molasses-based feed supplement. Preferably, the improved feed block is made by placing a package of granular mineral supplement wrapped in paper such as cardboard or kraft paper in a tub, and pouring a hot mixture of feed supplement around the inner package. When the feed supplement hardens, the resulting feed block can be provided to livestock to supplement their diet.

The feed block is consumed by allowing the livestock to lick it. To some extent, the livestock can select either of the two different supplements for consumption. However, the livestock are prevented from entirely consuming just one of the supplements as the moisture caused by an animal licking the block causes the less desired portion of the block, usually the mineral supplement, to fall over the more desired portion. Thus, the livestock are required to eventually consume both supplements."

U.S. Pat. No. 5,622,739 to Benton shows in its Figures two embodiments. Benton FIGS. 1 and 2 show a cylindrical feed block with a shell of dehydrated molasses around a body of mineral supplement 11 provided as in inner cylinder embedded in the shell. FIG. 3 shows another cylindrical feed block with the mineral supplement 11 provided as multiple dispersed packages embedded in the dehydrated molasses shell. In both embodiments, the mineral supplement is embedded by pouring the dehydrated molasses feed supplement around the packages of mineral supplement. In the multi-package embodiment it is not clear how the placement of the multiple dispersed packages occurs such that they are embedded in the dehydrated molasses in desired positions.

Benton U.S. Pat. No. 5,622,739 asserts that: "One important benefit of the feed block of the present invention is that the consumption of feed and mineral supplements can be carefully controlled with a single feed block. In the past, it was generally required that two different supplements or blocks be provided, one for feed supplement and another for mineral supplement." However, with Benton's approach of using granulated mineral supplement in packages and pouring the feed supplement to make a "shell" around the packages, positioning the mineral supplement in a uniformly distributed fashion appears difficult. Further, when a package of granulated mineral supplement is uncovered by consumption of overlying feed supplement shell, the granulated material of the mineral supplement can flow or be dispersed by animal feeding action. If it does not disperse, it may be consumed in a large slug or it may be spilled and wasted, depending on animal behavior. Thus, as Benton notes: "To some extent, the livestock can select either of the two different supplements for consumption." However, consumption control appears more limited than desirable for most applications.

Benton U.S. Pat. No. 5,622,739 states that "the precise ratio between feed supplement and mineral supplement can be varied depending on the size and shape of the inner package of mineral supplement." Benton contemplates that the weight ratio of the molasses-based feed supplement to the minerals is between about 1 and 32. That is, the surrounding shell of the molasses-based feed supplement can range from 32 times the weight of the mineral supplement to equal in weight. Thus, Benton teaches that the molasses-based feed supplement is the majority component by weight, typically the majority by a large multiple. This means that at most 50% of the block weight is available for the other supplement—in Benton's teaching, minerals.

A block that more effectively uses low moisture block feed material, allows a majority of the block to be other (not low-moisture block) feed ingredients that are less expensive, regulates consumption of the other feed ingredients and is readily manufacturable would be highly desirable.

BRIEF SUMMARY OF THE DISCLOSURE

This discloses a consumption-regulated feed block for controlled consumption of animal feed, comprising: a mass of controlled feed material, the consumption of which is to be controlled, in compressed block, chemical block or hybrid block form; and an intake control matrix of low moisture block material positioned in the controlled feed material and forming consumption control pockets to regulate consumption of the controlled feed material by requiring an animal to consume by licking portions of low moisture block material in order to consume controlled feed material in an adjacent consumption control pocket.

DESCRIPTION OF DRAWINGS

FIGS. 2A, 2B, 2C, 2D, 2E, 2F and 2G show schematically plan views of additional embodiments of a consumption-regulated feed block with an intake-control matrix and a controlled feed material.

FIGS. 4A-4B show schematically methods of making a consumption-regulated feed block with an intake control matrix.

FIGS. 6A-6C are graphs of feeding results in trials comparing consumption rates of a low moisture block, a compressed block and a consumption-regulated feed block as disclosed herein.

DETAILED DESCRIPTION

Figure 1A:
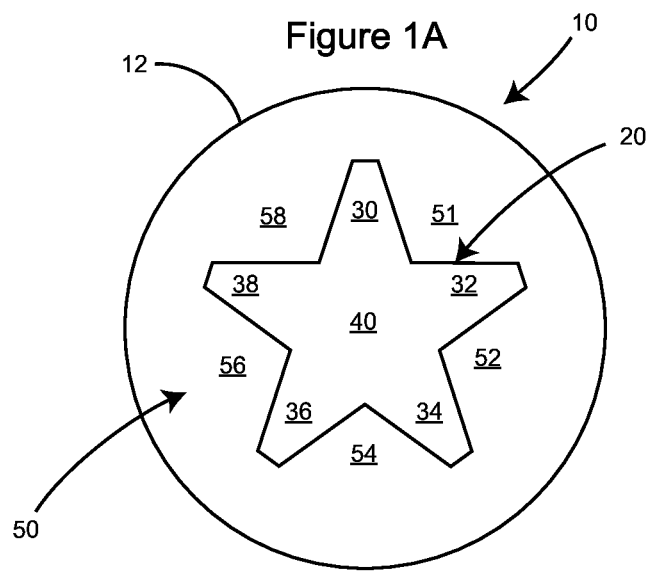
FIG. 1A shows in plan view one embodiment of a consumption-regulated feed block.

Feed Supplement Blocks.

Feed blocks are relatively solid masses formulated to contain and present a feed supplement consisting of relatively small amounts of nutritional or medicinal ingredients to animals for ad libitum consumption. These are currently made primarily by three methods and classified by these methods:

1. Poured/chemical blocks, which are made by hardening the combined ingredients of the product with chemical reactions between water and mineral oxides. Examples of such blocks are found in U.S. Pat. No. 4,016,296 (DeSantis), U.S. Pat. No. 4,027,043 (Schroeder), U.S. Pat. No. 5,236,717 (Vinci), U.S. Pat. No. 6,726,941, (Ethington, Jr. et al.) and U.S. Pat. No. 6,793,947 (Bachmeier). The reactions used to cause hardening vary.

2. Pressed and hybrid blocks are made by blending ingredients, conditioning them, and placing them under pressure, which may or may not include heat, with an optional binding agent to attain hardness. Examples of such blocks are found in U.S. Pat. No. 3,532,503 (Kviesitis). Kviesitis describes making a block by mixing molasses with a non-absorbent carrier material that is then dried. A surface active emulsion is then mixed with the dry material and the mixture is steamed and pressed into blocks. U.S. Pat. No. 6,168,803 (Harris) also describes a pressed block, but it is more of a hybrid or composite of a chemical block and pressed block. Harris' abstract describes the method as follows: "A process for preparing animal feed blocks requiring minimum physical compression which consists of adding an aqueous feed mixture to dry or semi-moist nutritive ingredients and at least one alkaline earth metal oxide. The resulting non-pourable and non-pumpable mixture is then transferred to a receiver, such as a mold, and subjected to compression."

3. Low-moisture blocks are made by dehydration of the base ingredient, usually a molasses or molasses derivative, through thermal evaporation. Here too, there are hybrids, which may be formulated to achieve a particular physical objective. U.S. Pat. No. 4,749,578 (Benton et al.) discusses an improved molasses feed block that is water resistant, non-porous, hard and vitreous. Said feed block is generally manufactured from a fluid feed composition comprising molasses, unsaturated free fatty acids and an amount of a bivalent base sufficient to saponify said fatty acids into an insoluble soap to enhance the water resistance of said feed block. Co-pending application Ser. No. 13/838,089 by Fu et al., filed Mar. 15, 2013 shows a low moisture block formulated for cold flow resistance. In general, low moisture blocks have the lowest moisture content, while pressed and hybrid blocks contain more moisture and poured/chemical blocks contain the most moisture.

Controlled Feeds.

For various animals, feed supplements are used to improve productivity and/or health. In particular, productivity in the form of weight gain, meat or milk quality, lactation and reproduction may be influenced and improved by supplements. Supplements may include salt, minerals, vitamins, micronutrients, medicines and other feed additives or ingredients. Examples of such additives are protein meals; grain; food, feed or grain processing by-products, fats, oils or oil processing byproducts, magnesium oxide, anthelmintics, insecticides, larvicides, insect growth regulators, essential oils, synthetic feed ingredients, amino acids and nutriceuticals. Some feed supplements are unpalatable to the intended animals, who will tend to avoid consuming them when presented directly or insufficiently masked with other feed elements. With these supplements and certain other feed ingredients, it is important to have them ingested in the desired amounts, but to avoid excess consumption that is economically wasteful and potentially harmful to the animal. While individual feeding and mechanically metered feeding can be used to control consumption of key feed ingredients, these require labor or capital investment in feed metering systems or other costs. It is preferable to allow an animal to determine its own feed intake, but left to its own instincts, an animal may over-consume or under-consume an important feed ingredient. Also, consumption of the feed supplement may vary widely among animals sharing a supplement block, so that not all get the same benefit. The present feed block provides a method to control consumption of feed ingredients in a highly palatable form.

Structures for Consumption-Regulated Blocks.

A feature of the consumption-regulated block of the present invention is to use the consumption-regulating characteristics of hardened, low-moisture block material to form an intake control matrix within a feed block that provides consumption control of a controlled feed material that is positioned in and around the intake control matrix. The intake control matrix is positioned in a block made of the controlled feed material so that control pockets are formed within the intake control matrix and/or between the matrix and the container that holds both the intake control matrix and the controlled feed. The animal for which the block is intended cannot consume the controlled feed material in the control pockets easily without first consuming and removing at least some interfering portion of the low moisture intake control matrix. Thus, the slow rate of removal of the low moisture intake control matrix helps control the rate of consumption of the controlled feed material.

On the other hand, the low moisture block material is highly palatable. Thus, although it slows consumption by interfering with access and biting, it also attracts licking and consumption of the low moisture block and, unavoidably, consumption of the controlled feed material adjacent to and within the low moisture intake control matrix. In some feeding situations, such as with younger animals where increased consumption of some feed ingredient is desired, the low moisture block that is palatable and an attractant can also be made softer (e.g., by less dehydration) so that it has less of an interference effect. The result of using the low-moisture block matrix integrated with a mass of controlled feed material is controlled consumption of the controlled feed material, almost as if it were fed in metered fashion to the consuming animals. The animals may be attracted to consume a material less palatable than the low-moisture block material, but at the same time they can only consume a limited amount of both the palatable low-moisture block material and the adjacent, usually less palatable controlled feed. If the animal should find the controlled feed material more palatable than the low-moisture material, that low-moisture material, which must generally be consumed by licking, will still serve to limit consumption of both.

Low moisture blocks that are homogeneous have manufacturing limits, because it is difficult to mix into them much more than 20%-45% dry matter, which is the usual form of feed supplements. But with a separate intake control matrix of low-moisture block material integrated with a mass of controlled feed material, the total percentage (by weight) of the controlled feed material in a block can be significantly higher than 20%-45% of total block weight. The low-moisture block material in the intake matrix thus provides control over a larger mass of controlled feed material than is possible in a homogenous mixture of low moisture block material and other feed ingredients or in a block per Benton U.S. Pat. No. 5,622,739, where multiple wrapped packages of mineral supplement are deposited in a shell. This permits use in a feed block of lower cost, more readily available feed ingredients (such as ethanol by-products, e.g., distiller dried grains) in a consumption controlled situation, instead of feeding these ingredients totally ad libitum.

A wide variety of feed blocks, addressing a wide variety of nutritional and economic objectives can be formulated by varying the portion of the feed block that is controlled feed material or intake control matrix, the ingredients in these two components and the configuration of the intake control matrix relative to the controlled feed material.

Figure 1B:
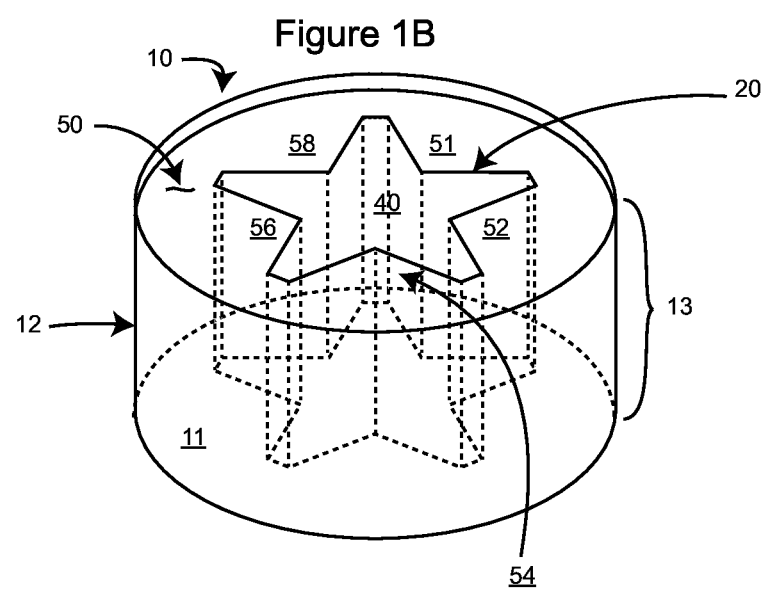
FIG. 1B shows in perspective view the embodiment of FIG. 1A.

As seen in FIGS. 1A and 1B, in one embodiment of a consumption-regulated block 10 in a container 12 with a bottom 11, cylindrical side walls 13 and an open top, an intake control matrix 20 is in the form of a shaped mass of low moisture block material at the center of consumption-regulated block 10, with a plurality of arms 30, 32, 34, 36, 38 extending from a central hub 40. Specifically, FIGS. 1A and 1B show a roughly star-shaped (which may have truncated points) or paddle wheel-shaped intake control matrix 20 with five arms projecting from a central hub 40. The controlled feed 50 surrounds the matrix 20 and is located in the control pockets 51, 52, 54, 56, 58 that are defined by the intake control matrix 20 and the container 12. If the animal finds the low moisture block material more palatable, then in pursuing it by licking, it will necessarily also consume the controlled feed adjacent the low moisture block material. If the animal finds the controlled feed more palatable, then in pursuing it by licking or biting, it will encounter the low moisture block material, which will at some point after consumption of the accessible controlled feed material interfere with further consumption of that material. The animal will necessarily address consuming the low moisture block material adjacent to the controlled feed that the animal has eaten. The consumption control pockets formed regulate consumption of the controlled feed material, by requiring an animal to consume by licking portions of low moisture block material matrix 20 in order to consume controlled feed material 50 in an adjacent consumption control pocket.

The intake control matrix 20 may have a variety of ingredients and hardness qualities and take a variety of forms, all of which provide control pockets that accommodate the controlled feed. The size and shape of these various forms may be selected based on animal eating parameters, such as on the size and shape of the jaw and/or mouth and/or tongue size and feeding habits of the animal (i.e., factors based on species, breed and physiological stage of growth and development) or on the consistency of the controlled feed mass. It may also be based on the desired rates of relative consumption of the controlled feed and the low-moisture block material. That is, each of the forms may be more suitable for certain feeding and management applications or certain animals. For example, instead of limiting consumption, for a feed block intended to direct nutrient consumption for younger animals, the intake control matrix can be made of less hard block material, the palatability of which encourages consumption, while its relative softness provides a milder consumption limitation. The size of control pockets can be varied as well as the percentage of the total feed block volume occupied by the intake control matrix relative to the controlled feed material. For example, the intake control matrix can occupy 7.5% to 50%, 15% to 50%, 7.5% to 40%, or 20% to 40% of the total feed block volume or weight or essentially any percentage of the total feed block volume or weight, consistent with the ability to form the intake control matrix by the methods described below. In some embodiments, the controlled feed material in the container is present in a weight ratio relative to the low moisture block material that is greater than 1:1, for example, 1.1:1, 1.2:1, 1.3:1, 1.4:1 or 1.5:1. In some embodiments, the controlled feed material in the container is present in a weight ratio relative to the low moisture block material that is greater than 1:1, and up to 2:1, 3:1, 4:1, 5:1, 6:1, 7:1 or 8:1 or anywhere in the range from 1:1 up to 8:1. The geometry of the intake control matrix, if made more intricate (e.g., with numerous, smaller control pockets), may permit control of the controlled feed material with relatively less of the material in the intake control matrix.

Figure 2A:
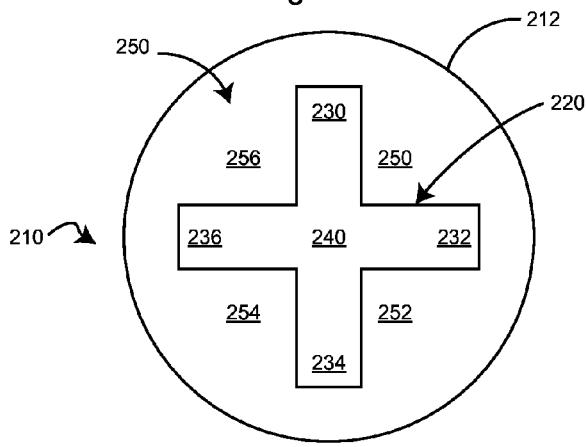

As seen in FIGS. 2A-2E, the intake control matrix can have a variety of geometric shapes. FIG. 2A shows in plan view a feed block 210 with intake control matrix 220 that is a variation on FIG. 1A's star or paddle wheel-shaped intake control matrix with five arms projecting from a central hub 40. Specifically, FIG. 2A shows a roughly paddle wheel-shaped intake control matrix 220 with four arms 230, 232, 234, 236 projecting from a central hub 240 embedded in controlled feed material 250. The feed block 210 of FIG. 2A is held in container 212. The controlled feed surrounds the hub 240 and is located in the control pockets 250, 252, 254, 256 (here approximately quadrants) that are defined by the intake control matrix 220 and the container 212.

Figure 2B:
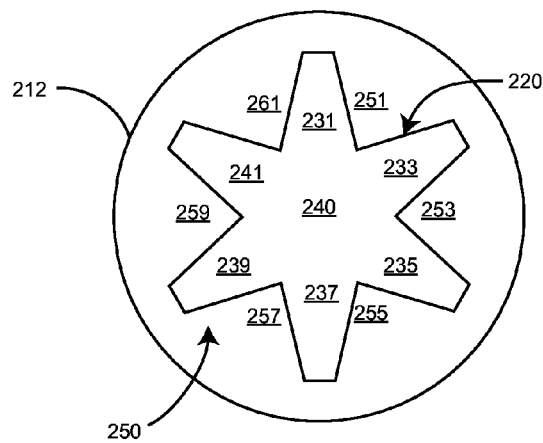

FIG. 2B shows in plan view another roughly star or paddle wheel-shaped intake control matrix 220 with six arms 231, 233, 235, 237, 239, 241 projecting from a central hub 240 embedded in controlled feed material 250. The feed block 210 of FIG. 2B is held in container 212. The controlled feed surrounds the hub 240 and is located in the control pockets 251, 253, 255, 257, 259 and 261 that are defined by the intake control matrix 220 and the container 212.

Figure 2C:
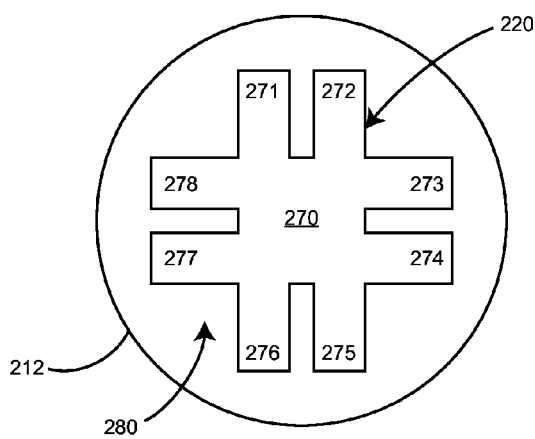

FIG. 2C shows in plan view a roughly #-sign-shaped intake control matrix 220 with eight arms 271-278 projecting from a central hub 270 embedded in controlled feed material 280. The feed block of FIG. 2C is held in container 212. The controlled feed 280 surrounds the hub 270 and is located in the control pockets that are defined by the intake control matrix arms and the container 212.

It will be clear that the dimensions of the hub and associated arms in each of FIGS. 2A-2C can be varied to make the control pockets larger or smaller. As noted, this can be done to adjust the amount of intake control that the intake control matrix poses to animals of a given size, based in part on the ease with which an animal may remove the controlled feed portions in the control pockets by the nature of its tongue or teeth and also dependent on jaw size and/or shape. Consumption control may be modulated in part by size and shape of control pockets relative to the animal jaw size and shape. Because the low moisture block material is hardened enough to require licking for consumption and the controlled feed may also be hardened, control over block ingredients will not be lost in a sudden dispersion of material that is loose or crumbles readily but for which regulated consumption is important, as might occur with an embedded packet of granular feed supplement as proposed in the prior art.

FIGS. 2D and 2E show in plan view embodiments in which the hub 240, 260 (respectively) of a feed block as in each of FIG. 1A and FIG. 2C has an opening 242, 262 (respectively) in approximately its center to define a further control pocket. This gives an additional opportunity to increase the percentage amount of the controlled feed and still maintain consumption control. FIGS. 2F and 2G show schematically in plan view embodiments of blocks 10 in containers 12 in which the intake control matrix 220a has a simplified geometry, namely a centrally-located, generally rectangular block mass or generally cylindrical mass (respectively) surrounded by controlled feed 50, which may be suitable for some applications.

It will be seen from the figures showing the various alternatives that, due to the intake control effect, the respective materials of the control matrix and the controlled feed are consumed largely together; thus, at each horizontal level of the consumption-regulated block as it is consumed from the top down, the intake control matrix will provide essentially the same cross-section (as seen in the plan views) and present approximately the same proportion of intake control matrix surface area relative to controlled feed surface area. When this proportion remains about the same at each cross-sectional, horizontal level from the top surface of a fresh, unconsumed, consumption-regulated block to near the bottom of a container, the amount of consumption control remains about the same. This is important, because different animals in a herd will be attempting to consume the block at different times. Consumption will be more equally distributed among herd members if the same consumption opportunity, defined by the available surface area of the intake control matrix and the surface area of the control pockets, exists continuously from the offering of a fresh, consumption-regulated block to the herd until that block is consumed down to the bottom of the container. However, it has been noted that animals can become acclimated or habituated to a particular form of block consumption. In this situation, an animal that has followed a licking behavior on a feed block to address the low moisture block material may continue that behavior as long as the block is present, even if the surface area of the intake control matrix changes, reduces or disappears near the bottom. Thus, the intake control matrix need not extend all the way to the container bottom, while still providing consumption regulation, due to continued licking behavior.

Forming Consumption-Regulated Blocks.

Figure 3:
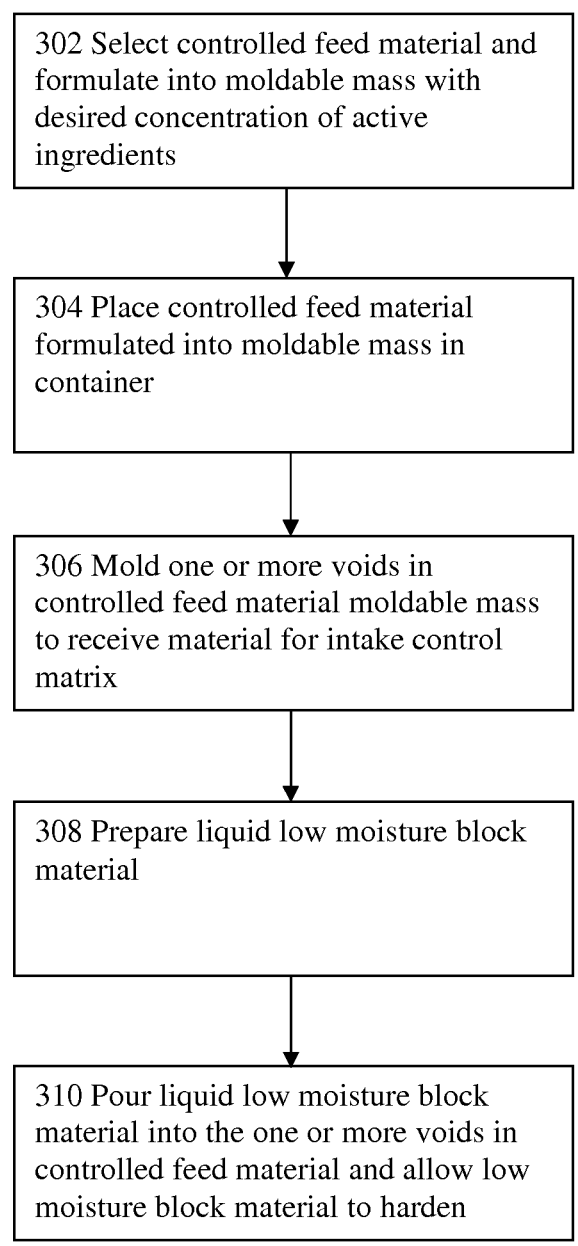
FIG. 3 is a high-level flowchart of a process for making a consumption-regulated feed block with an intake-control matrix of low moisture block material.

The consumption-regulated low moisture blocks of the present disclosure for controlled consumption of an animal feed may be made by several methods. Manufacturing may vary by the method used. In one embodiment, the maker may place in a container with side walls a mass of controlled feed material that is moldable; form in the mass of controlled feed material an intake control matrix defining (typically with the container) a plurality of control pockets filled with a low moisture block material; and allow the low moisture block material to harden. FIG. 3 shows a high level flowchart for one method 300 for making a consumption-regulated block as shown in FIGS. 1A-1B. The basic approach of the method is to begin the process with the controlled feed in a moldable mixture. The controlled feed will contain the minerals, supplements or other ingredients that are to be consumed, but consumed in a controlled manner, by amount and/or rate of the key ingredients. The controlled feed may contain other ingredients besides those specifically selected for controlled consumption. The other ingredients may be grains, processed grains, fats or other nutrients. The controlled feed is prepared in a form that permits it to be mixed, placed in a container and shaped to form an at least somewhat stable void in the shape of the desired intake control matrix. The controlled feed may thus be prepared using the known methods for forming the material for a compressed block, a chemical block or a hybrid block. The void in the shape of the desired intake control matrix is formed before or in the final compression step or during the chemical reaction that solidifies the controlled feed. When this void is shape-stable, it is filled with, and acts as a mold for, the low moisture block material, which is allowed to harden to form the intake control matrix, with the controlled feed in the control pockets of the intake control matrix.

Referring to FIG. 3, the method 300 begins in step 302. The feed block maker selects and formulates a controlled feed material and makes it into a moldable or formable mass with a desired concentration of active ingredients, e.g., one of more feed supplements whose consumption is to be controlled. Making the moldable mass may be one step in a compression, chemical or hybrid block forming process as described above. In step 304, the maker places the controlled feed material, formulated into a moldable mass but not yet hardened, in a container. In step 306 the maker forms in the still-unhardened, controlled feed material moldable mass a void to receive material for the intake control matrix. The void has the shape of the desired intake control matrix. This may be done by pressing into the controlled feed material moldable mass a form that displaces or deforms certain portions of the mass to make the desired void shape. In a compressed block process, making the void may be part of the compression. In a chemical block process, the void form may need to stay in place until chemical curing causes the controlled feed material to become sufficiently hardened to hold the desired void shape. In either case, the step or operation of void-forming will permit the removal of whatever mold or molding tool is used, so that after molding tool removal there is a void, preferably an open-top void, that holds its shape with sufficient strength to receive the liquid, low-moisture block material placed in the void for hardening. In one embodiment, the void may also be largely enclosed, with an access point for introducing the low moisture material to fill the enclosed void. In another embodiment, a controlled feed mass may be placed in a container with a mold form extending upward from the bottom surface of the container. Removing the controlled feed mass solidified around the mold form in the container and inverting it provides a feed block with a void ready to be filled with low-moisture block material to serve as a control matrix.

In step 308, the block maker formulates and prepares the liquid low moisture block material to form the intake control matrix. This may include feed ingredients that are either similar to or different than those in the controlled feed material. This may be because these are more suitably delivered in the low moisture block material or to augment a standard mix used for the controlled feed. Conventional dehydration of molasses or a similar base and blending with other ingredients may be used. In step 310, the block maker introduces flowable low moisture block material into the void that was formed in the controlled feed material and allows the low moisture block material to harden into the control matrix. When the void has an open top, the material may be introduced by pouring. Upon this material hardening, the consumption-regulated block is formed and ready to deploy.

Seen in FIG. 4A is a container 12, into which a controlled feed material moldable mass 450 may be placed. A form 400 that displaces certain portions of the mass to make the desired void shape (in this example, the shape is one already seen in FIGS. 1A-1B) may be inserted from above (see arrow 410 and surface outline of void 412) while the mass 450 remains formable. As can be understood, in this method, it may be difficult to get the void 412 for the intake control matrix to reach all the way to the bottom of the consumption-regulated block container 12 if the mass is moldable but not very flowable. In this case, it may be necessary to apply significant downward force into the controlled feed mass with the mold 400. This allows the insertion of a mold 400 to be part of a compression step in a compressed block. Further, if the compressed block void 412 holds its shape after compression, the mold 400 can be removed immediately and the block with void can be moved to a next production step in which the void is filled with low moisture block material forming the control matrix and the mass 450 provides the mold for the matrix.

In a chemical block, with a liquid mixture not yet hardened by the hardening reaction, the mold 400 inserted to form the void may need to stay in place until hardening occurs. This appears less desirable, because each block in process requires its own mold for the duration of hardening; however, a fluid chemical block mixture may require a mold of lesser strength and/or facilitate mold removal. Thus, the controlled feed material may be material that is either compressed or hybrid block material or chemical block material, in either case unhardened to allow the mold to form a void for the control matrix.

To allow insertion and removal of a mold or other forming tool, that mold or tool may need to be tapered so that the cross-sectional surface area of the intake control matrix decreases somewhat from its upper surface towards the bottom of the block container and/or the mold may need to stop short of extending all the way to the container bottom. (A mold release coating suitable for animal feed (e.g., an edible oil spray layer) may also be used on the mold outer surface to facilitate mold insertion and removal.) The amount of taper depends on the moldability or formability of the material into which the mold is inserted. Taper may be minimized, so that at each level of the consumption-regulated block as it is consumed, the matrix will provide essentially the same intake control matrix cross section and same amount of consumption control. However, a tapering intake control matrix can still be effective to the container bottom, notwithstanding its smaller cross-sectional area of low moisture material nearer the container bottom, because, as the animal places its jaw, mouth and tongue deeper in the container, the sides of the container play a greater coordinated intake control role with the matrix to cause the animal to consume the low-moisture block material by licking, because of limited access to the controlled feed material. After removal of some low moisture block material, as required to allow the animal to easily access the controlled feed material, the animal will consume that. The controlled material will (palatability aside) almost always be more readily consumed than the low-moisture block material of the intake control matrix, which typically requires licking.

In another embodiment, it may be desirable to form the consumption-regulated block by forming the intake control matrix first before combining it with the controlled feed. This method is also understandable from FIG. 4A, viewing the mold 400 instead as an intake control matrix 400 in a preformed mass of the same shape as the mold, which has been formed outside the container 12. After the matrix 400 achieves shape stability during a forming process outside the container 12, it is placed in a container 12 to form a consumption-regulated block. Two approaches are possible. If the matrix 400 has sufficient hardness and integrity, it can be pushed into a mass of controlled feed 450 that is flowable and was previously placed in the container. The controlled feed then moves into and fills the control pockets of the matrix 400 during or shortly after the intake control matrix is inserted. Alternatively, an intake control matrix 400 made outside the container 12 may be placed and supported in an empty container 12, which is filled in a pouring or extruding process that places formable or flowable controlled feed material in and around the matrix. A matrix of sufficient strength may be made outside of the container by filling a (typically temporary) mold made of an edible cardboard or similar material with low moisture block material; after the low moisture block material hardens, the intake control matrix may be placed in the container (usually after removal of the temporary mold, unless it is edible). Once the intake control matrix is present in the container, and assuming the controlled feed has been prepared in such a format that it can be poured in and around the intake control matrix, the controlled feed material is placed in and around the matrix. With a controlled feed made by a chemical block process, it may be possible to pour the controlled feed material as a liquid to allow it to cure and harden in the control pockets of an intake control matrix made in advance and placed in a container. With a controlled feed made for a compression forming process, unless the feed is quite pourable, it may be necessary to place the feed more or less directly in a control pocket of a pre-made matrix and deliver compression to that pocket to fill it and consolidate the controlled feed.

In another alternative seen in FIG. 4B, the consumption-regulated block may be formed by placing both the low-moisture block material and the controlled feed in the container simultaneously or substantially simultaneously, such as by co-extrusion of the low-moisture block material and the controlled feed. As seen schematically in FIG. 4B, the extrusion head 420 has a central path 422 that has the desired cross-section of the intake control matrix to be formed in the container 12 (shown in phantom at 432). The low-moisture block material flows through the central path 422, as shown at arrow 424. The extrusion head 420 has an outer path 426 surrounding the central path 422. The controlled feed flows through the outer path 426 as shown at arrows 428. With the extrusion head sized for insertion (see arrow 411) to fit into container 12 and to be raised as the low-moisture block material flows through the central path 422 and the controlled feed flows through the outer path 426, both portions of the consumption-regulated block may be formed simultaneously. With this method the controlled feed as deposited in the container 12 (see material at 436) must have a consistency sufficient to hold the liquid low moisture block material essentially in its desired intake control matrix shape until that low moisture block material is hardened. In one embodiment the co-extrusion is controlled such that the deposit of the low moisture block material lags a bit behind the deposit of the controlled feed, so a portion of the shape to be filled is formed ahead of the placement of the low moisture block material.

Other methods of forming the consumption-regulated block are possible, and this disclosure is not limited to those expressly described, as long as the intake control matrix of low moisture block material is formed and generally keeps its shape, and the control pockets in the matrix are filled with the controlled feed in the final product.

Using Consumption-Regulated Blocks.

In use, a consumption-regulated low moisture block may be placed with one or more animals, to which it is desired to feed one or more specific controlled feeds, such as minerals, micronutrients, or other feed supplements. Feeding ad libitum on the consumption-regulated block, the animals will be attracted to one or both of the controlled feed material or the low moisture block material and will consume it. If the animals are attracted to consume the low-moisture block material, then they can only consume a limited amount of the palatable low-moisture block material without also consuming the adjacent, usually less palatable controlled feed. If the animals find the controlled feed material more palatable than the low-moisture material, that low-moisture material, which must generally be consumed by licking, will still serve to limit consumption of both block components, so that both must be consumed almost at the same time, with the low moisture block material controlling the consumption rate of both.

The consumption-regulated block thus may serve to induce the consumption of less palatable but important feed ingredients. It may serve to accelerate the consumption of such less palatable ingredients, relative to a block that does not have the palatable low moisture block material intake control matrix. At the same time, the nature of the low moisture block material of the intake control matrix is to control consumption both of that material and the controlled feed, by reason of the interference with access to the controlled feed in the control pockets caused by the intake control matrix and the container. From studies of low moisture blocks, the rate of its consumption by licking is relatively well-known. A properly formulated and designed consumption-regulated block can thus encourage consumption of one or more desired feed ingredients at a known rate and at the same time help prevent over-consumption of these ingredients. Consumption of one or more key ingredients can then be controlled to be more economically optimal than pure ad libitum consumption of the ingredients when they are available without control. The amount of controlled feed desired for increasing animal productivity can be delivered by the controlled consumption of the block, but consumption of an amount of the controlled feed that might be harmful or economically inefficient can be avoided.

The consumption-regulated blocks made and used in accordance with the above disclosure may address a wide variety of nutrient objectives. Thus, almost any nutritional formulation of a low moisture block material known in the prior art may be used in the intake control portion of the block. For example, a nutritional formulation as set forth in Ser. No. 13/838,089, titled Low Moisture Feed Block with Cold Flow Resistance, which is incorporated herein by reference, may be used. Similarly, almost any nutritional formulation of a compressed block, chemical block or hybrid block known in the prior art may be used in the controlled feed portion of the block.

A consumption-regulated block in accordance with the above disclosure may be designed with one or more nutritional objectives and with control over the consumption of the ingredients presented in the block. Thus, where experience has shown that a desired consumption rate of a compressed block, chemical block, hybrid block or pure low moisture block is too low to achieve a nutritional objective or too high to achieve an economic objective, the designer of a block as disclosed above can work from the known consumption rate of a low moisture block material and using that in an intake control matrix suitable for the animal involved can control the consumption rate of the controlled feed with which the intake control matrix is combined. Because the controlled consumption rate is known (i.e., known to a sufficient degree for feed planning; animal type, other feed sources, weather and other known factors can cause consumption to vary) and both the intake control matrix and the controlled feed components are available to deliver the desired feed ingredients, the feed formulator has significant freedom to choose the particular percentage amounts within each component. The nutritional impact of the respective ingredients will be additive according to the volume percentages of the two components in the feed block volume consumed. The blocks will be formed with high volume ingredients like molasses beet and corn distillers by-products and low volume, but important, ingredients like vitamins A, D and E, Selenium, and magnesium oxide.

The effectiveness of a consumption-regulated block in accordance with the above disclosure has been observed in trials with cattle. In trials with three different herds, animals were provided with low moisture feed supplement blocks, compressed feed supplement blocks or a consumption-regulated block in accordance with the above disclosure. Each block provided protein at 20%. As shown in FIGS. 6A-6C, in each of the three trials, the objective of the consumption-regulated block was achieved of controlling consumption, as measured by pounds of feed per head per day (lb/hd/dy), to be significantly less than the level of consumption of a compressed feed supplement block comparable while also exceeding the level of consumption of the low moisture feed supplement block comparable. This demonstrates that the consumption-regulated block can be used in situations where it is desired to reduce consumption and thus consumption cost of a given feed supplement ingredient conventionally provided in compressed block form. This consumption control can be accomplished. The consumption-regulated block can however, also be used to increase total feed supplement intake, including that of any target ingredient to levels above that of a low moisture feed supplement block.

This type of control allows a feed supplement objective as to one or more specific ingredients to be achieved. If there is nutritionally unnecessary over-consumption of one of more ingredients in a compressed feed supplement block, that can be controlled to reduce the over-consumption. Alternatively, if any ingredient is not sufficiently consumed when formulated in a low moisture feed supplement block, the consumption-regulated block permits consumption of that ingredient to be increased. With the rate of consumption controllable and known, the composition of the consumption-regulated block can be formulated to deliver key ingredients from a nutritional viewpoint in sufficient amounts and to deliver no more than the necessary amount of an ingredient that, when over-consumed, adversely affects feed costs (or nutrition). This empowers the herd manager to more accurately achieve both nutritional and feeding cost objectives, and to use, in some instances, a less expensive ingredient, with the knowledge that it will be sufficient for a nutritional objective based on the known consumption rate.

The block material of the preceding examples and other formulations may be placed in a biodegradable container. For example, the biodegradable container is made from ground straw and wood fiber, which is coated with a soy flour solution for binding and is pressed and molded, or a container as disclosed in U.S. Pat. No. 6,337,097 or 6,561,787.

The block material of the preceding examples and other formulations may be formed in a container from which it is then removed. This permits it to be deployed without a container. Alternatively, it may be made in a production container, removed and then supplied with a biodegradable, weather-resistant wax based container applied by an immersion process, e.g., as disclosed in U.S. Patent Publication No. 2012/0315362, titled "Biodegradable, edible, weather resistant container for livestock feed supplement block". This is desirable in some feeding situations, where container disposal is an issue. For any block where the mass of controlled feed suitably surrounds the intake-control matrix and is suitably hardened (by compression and/or chemical action), the container is not necessary for block integrity. Although the sides of the block become available for animal access and the intake matrix may not extend to these sides, to provide at the side surfaces of the feed block the same consumption control as at the block's top surface, in many feeding situations the animals do not pursue consumption at the side surfaces, so the additional side surface feeding access makes no significant difference. Alternatively, the container-less block has reduced consumption regulation relative to a block in a container, but the reduction in control is small enough to be outweighed by the benefits or not needing to dispose of containers.

Alternatives.

Figure 5A:
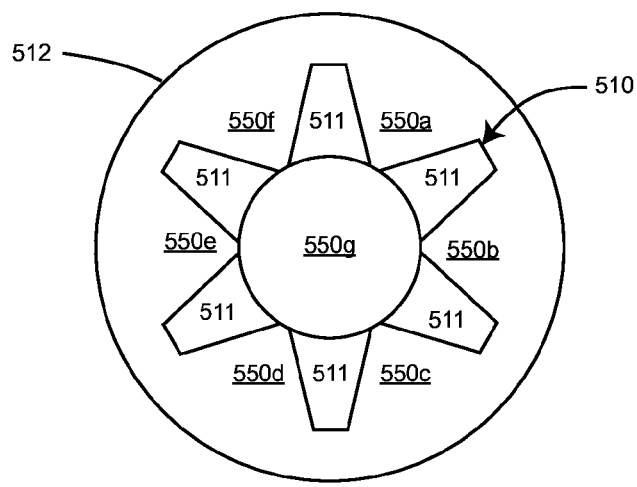
FIGS. 5A-5E show alternative configurations for a consumption-regulated feed block.

Several alternative forms of the consumption-regulated block and its methods for forming are possible. As seen in FIG. 5A, the intake control matrix 510 in container 512 may be formed of separate segments. For example, the intake control matrix 510 may resemble that of FIG. 2B but consist only of six arms 511 with no hub joining them, which define multiple control pockets 550a-550f. Instead, the area that would be the hub becomes one more control pocket 550g, filled with the controlled feed. To make the control pockets, the void-forming mold inserted in the moldable controlled feed in container 512 does not have a unitary volume. Rather, it is made up of six mold volume segments, one corresponding to each of the six arms 511. Six separate voids are created and each is thereafter filled with low moisture block material to form the matrix.

Figure 5B:
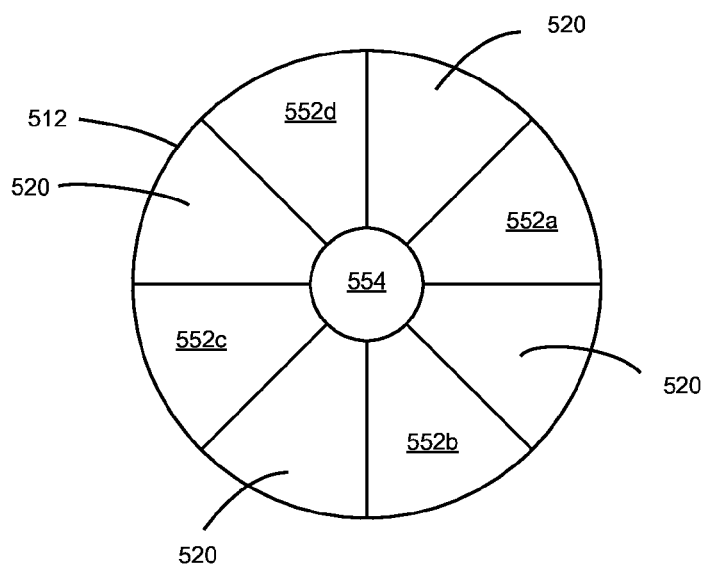

As seen in FIG. 5B, the intake control matrix may be formed from separate segments 520 that extend outwardly from the side walls of the container 512. Here four roughly pie-piece-shaped segments 520, equally spaced around the outer periphery of the container 512, define the control pockets 552a-552d for controlled feed. Truncated tips on the segments allow a control pocket 554 at the center.

Figure 5C:
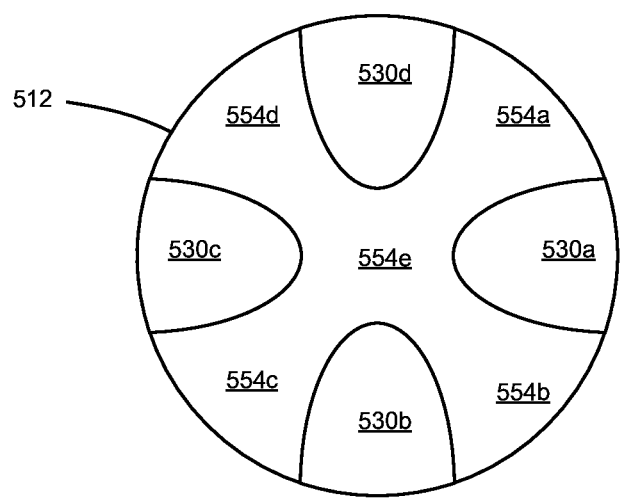

FIG. 5C shows a variant on the consumption-regulated block of FIG. 5B. Here, the separate segments 530a-530d of the intake control matrix are half-ellipses extending inward from the side walls of container 512. These form control pockets 554a-554e for the controlled feed. Although four such segments of low moisture block material 530a-530d are shown forming the intake control matrix, more or fewer may be used, as long as the control pockets 554a-554e formed are sufficiently bounded by the matrix segments and the container that the animals are forced to consume the controlled feed in pockets 554a-554e at essentially the same time and rate as the low moisture block material.

Figure 5D:
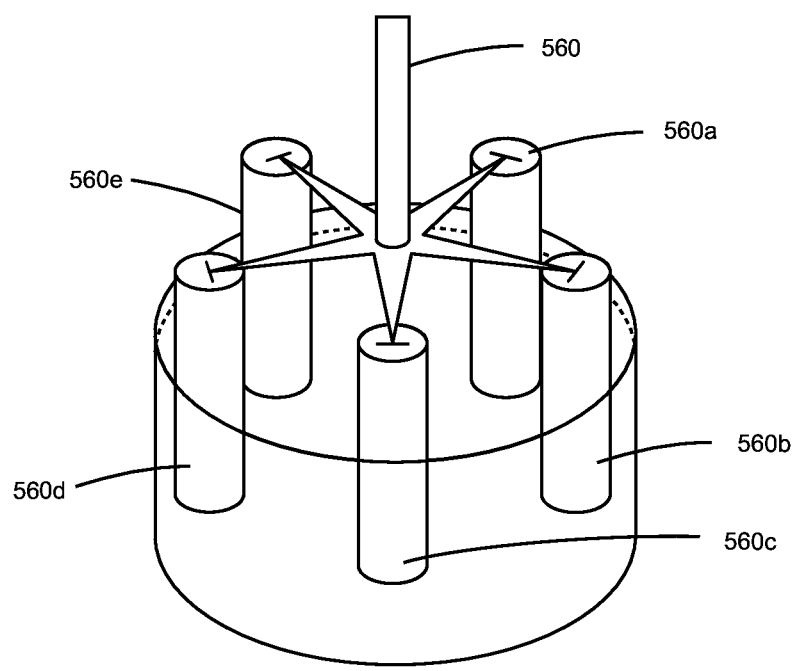
Figure 5E:
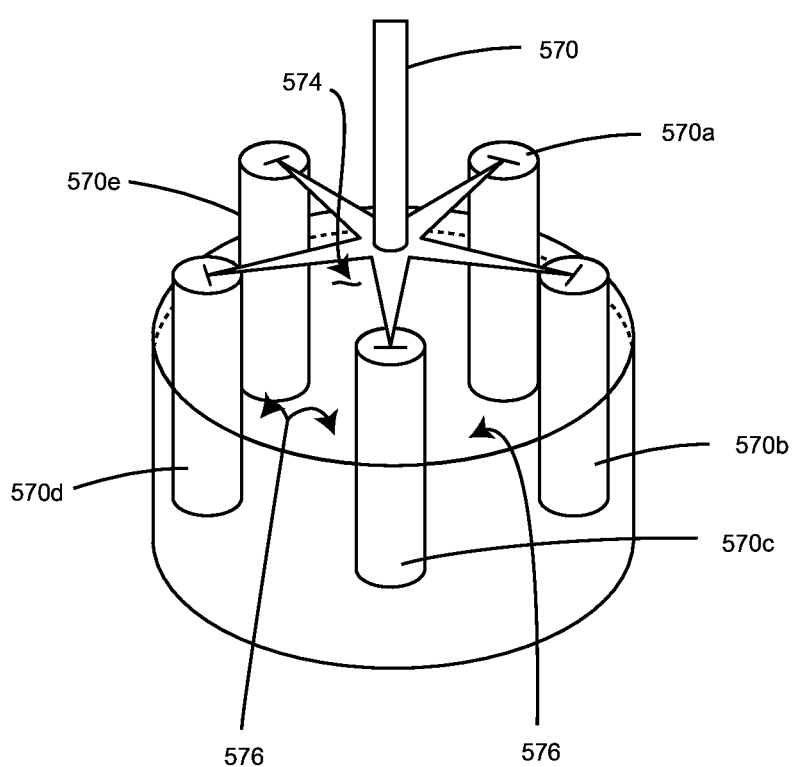

As a further alternative, as seen schematically in FIG. 5D, the intake control matrix may be formed by inserting into a relatively fluid, formable mass of controlled feed a previously-formed and hardened set of individual segments of low moisture block material. The locations for insertion are determined by insertion and holding tool 560 such that, after the segments 560a-560e are inserted, they together form an intake-control matrix that either provides the desired interference with consumption of the controlled feed or provides the desired locations of high palatability, that lead to a consumption-regulated feed block that is a combination of the intake-control matrix and the controlled feed. As seen schematically in FIG. 5E, instead of inserting a previously-formed and hardened set of individual segments of low moisture block material into a formable mass of controlled feed, the individual segments 570a-570e may each be supported by a support and holding tool 570 in a desired location in an empty container, while a formable (preferably pourable) mass of controlled feed 574 is placed (see arrows 576) around the individual segments. Once the formable mass of controlled feed 574 has hardened, the individual segments no longer need to be supported; rather the hardened mass will hold them in a desired location for the individual segments to serve as the intake-control matrix. Here, as in other embodiments, the formable mass of controlled feed is made from compressed block, chemical block or hybrid block.

Manufacturing Station.

Figure 7A:
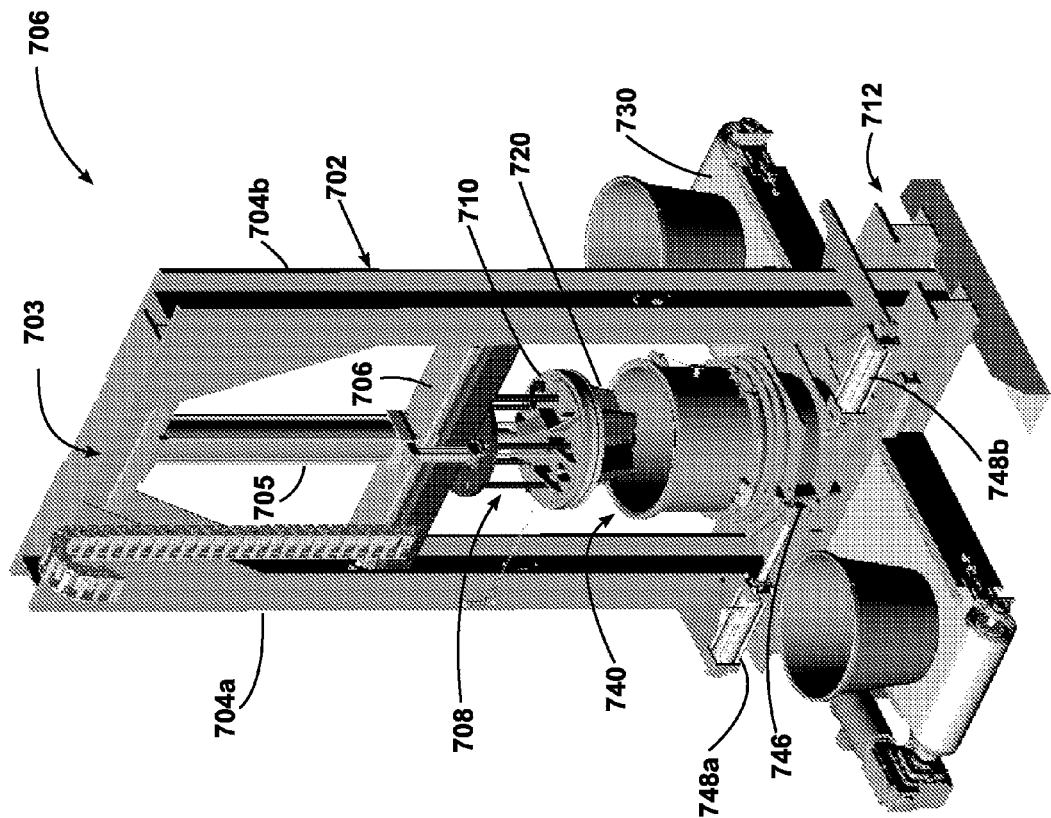
FIGS. 7A-7C are pictorial views of a manufacturing station for use of a mold driven into a container with controlled feed material to form a void for low moisture block material and a view of the mold used in the station by itself.
Figure 7B:
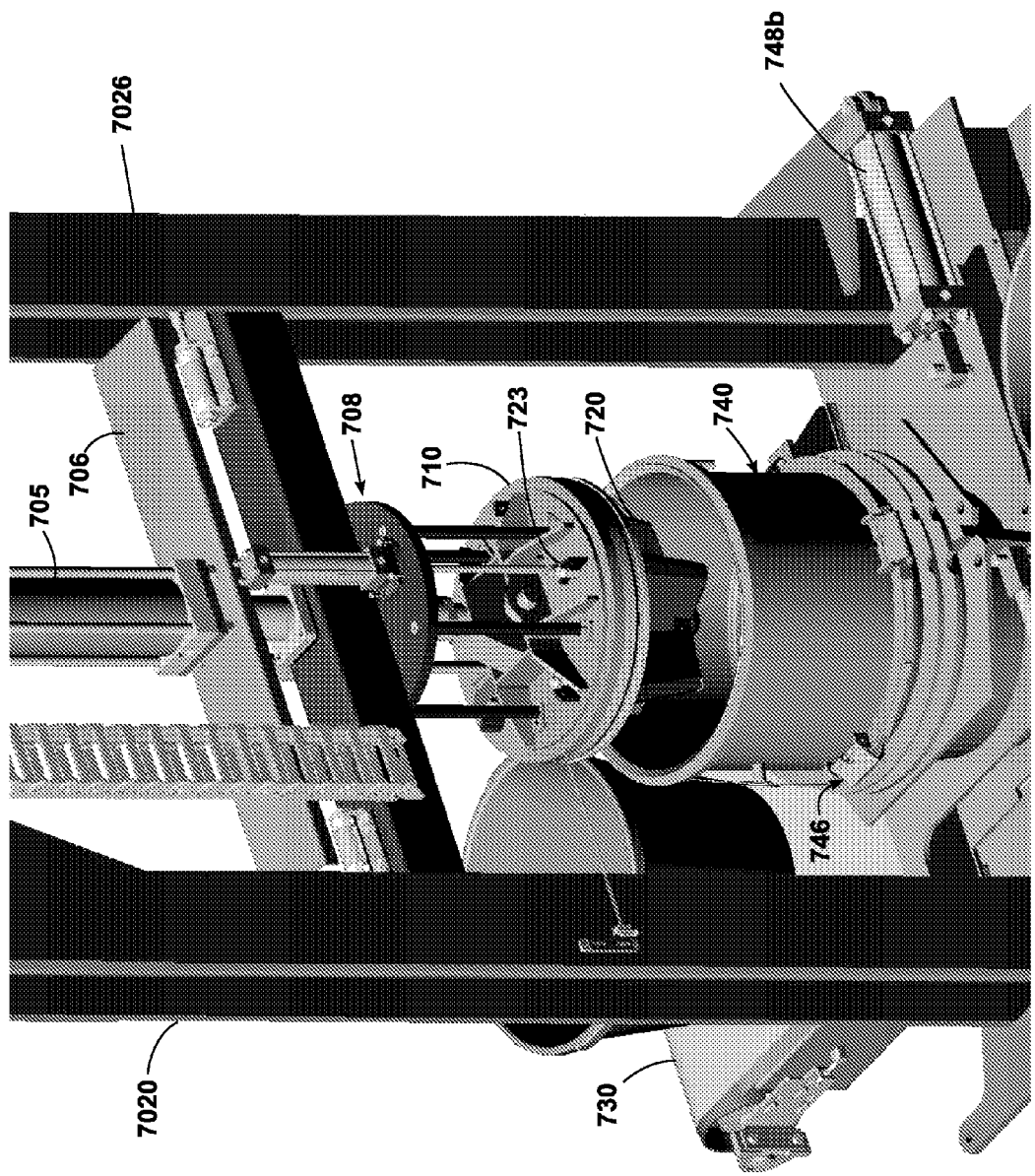

FIGS. 7A-7B are pictorial views of one embodiment of a manufacturing station 700 for use of a mold unit 720 driven into a container holding formable controlled feed material to form a void for low moisture block material as described above. In FIG. 7A the station is shown pictorially in overview. There is a station frame 702 formed from a pair of vertical, parallel station side rails 704a, 704b joined at their upper ends by a top crossbar 703. Below the top crossbar 703 and mounted for travel in and between the side rails 704a, 704b is a support bar 706. Extensible and retractable ram 705 provides the force to lower and lift the support bar 706 and thus also to press downward with the mold unit 720.

Referring also to FIG. 7B, this shows the mechanism for supporting and moving the mold unit 720 in a more-close-up view. Mounted below the support bar 706 on connection assembly 708 is an attachment plate 710 to which a mold unit 720 is attached for insertion into a mass of controlled feed material in a container. A feed block container may be held in a container holder 740 that is secured in a gripping mechanism 746 actuated by rams 748a, 748b. A conveyer 730 for moving containers to and from the container holder 740 is supported on a base 712 that also serves as the support for the station side rails 704a, 704b and a platform that supports the container holder 740.

Figure 7C:
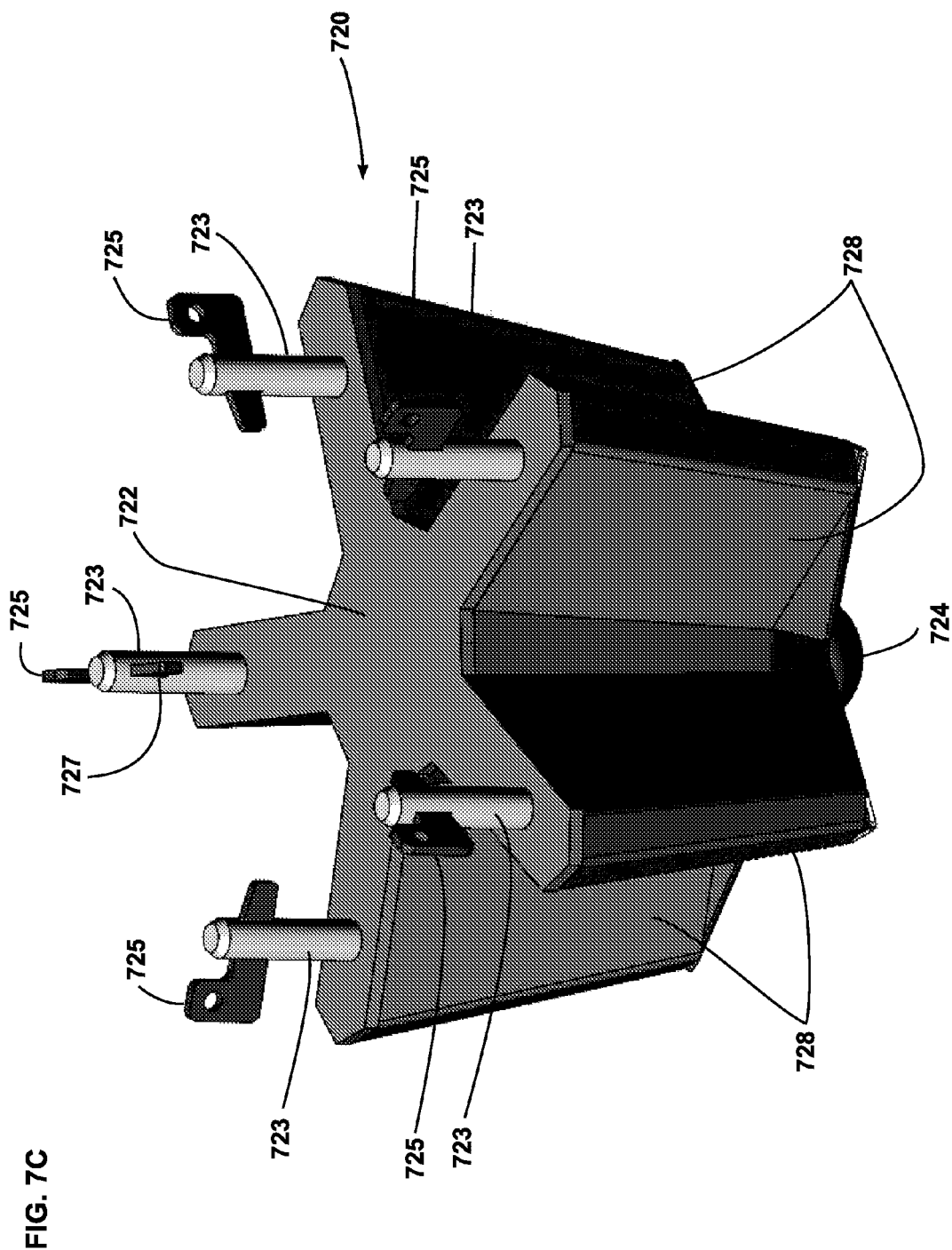

FIG. 7C is a view of a mold unit 720 used in the station 700. It has a top plate 722 from which descend a number of tapered sides 728 that form a mold with a shape roughly like a five-pointed star that tapers toward the bottom. At the center of the bottom is a rounded bottom rest 724. Extending upwardly from the top plate 722 and from near the end of each of the points of the star shape of the top plate 722 are pins 723. Each pin 723 has a corresponding key that passes through a key slot 727 of each of the pins 723. As can best be seen by reference to FIG. 7B, the pins 723 are used to attach the mold unit 720 to a connection assembly 708 that is suspended from the support bar 706. The pins 723 reach up through an attachment plate 710 that is part of the connection assembly 708. The pin keys 725 can then secure the mold unit 720 in its mounted position above the container holder 722. In its resting and waiting position, the mold unit 720 is raised high enough above container holder 722 that a container can be placed in the container holder 740.

In operation, once a container partially filled with controlled feed material is placed in the container holder 740 under the mold unit 720, the mold unit is guided and advanced by the ram 705 to contact and enter the controlled feed material in the container. The controlled feed material may vary in fluidity and or malleability, but the ram 705 is powered with enough force to displace the controlled feed material as needed to form a void for filling with low moisture block material. The attachment plate 710 or a lid plate (not shown) placed at and around the top of the mold unit can assist in preventing displaced controlled feed material from being forced out of the container. The container will be filled with a calculated volume of controlled feed that allows the mold unit 720 to displace the controlled feed without causing any (or excessive) spilling of controlled feed material out of the container as the mold unit 720 penetrates into and displaces the controlled feed material as the void is formed.

Once the void in the controlled feed material is formed and sufficiently shape-stable, the mold unit 720 may be lifted by ram 705 to remove it from the controlled feed material. (Container holder 740 resists any tendency to lift the container with the mold.) This leaves the void open for filling with low moisture block material, forming the intake control matrix after it hardens. Accordingly, once the void is formed and sufficiently shape-stable and the mold unit 720 extracted, the container will be removed from the container holder 740 and conveyed to a filling station (not shown) for low moisture block material to fill the void and form the control matrix.

It will be seen that the mold unit 720 shown in FIG. 7C is exemplary only and other shapes disclosed herein can also be used. See, e.g., FIGS. 1A-1B, 2A-2G.

The information and examples described herein are for illustrative purposes and are not meant to exclude any derivations or alternative methods that are within the conceptual context of the invention. It is contemplated that various deviations can be made to this embodiment without deviating from the scope of the present invention.

We claim:

1. A feed block for controlled consumption of animal feed, comprising:

a first feed block portion which contains protein, comprising
a mass of controlled feed material in hard block form, wherein the controlled feed material comprises one or more feed supplement ingredients that contain the protein; and a second feed block portion which contains molasses, comprising
an intake control matrix comprising low moisture block material positioned in and adjacent to the controlled feed material of the first feed block portion wherein the intake control matrix defines consumption control pockets comprised of the controlled feed material, wherein the low moisture block material comprises the molasses,
wherein the intake control matrix is present in the feed block in an amount that occupies no greater than 40% of total feed block weight of the feed block, and
wherein the consumption control pockets are configured to regulate consumption of the controlled feed material by requiring an animal to lick portions of low moisture block material in order to consume controlled feed material in an adjacent consumption control pocket.

2. The feed block of claim 1, further comprising an open top container with side walls, wherein the container holds the controlled feed material and the intake control matrix, with the side walls of the container aiding the intake control matrix to form at least one consumption control pocket.

3. The feed block of claim 1, wherein the intake control matrix comprises a shaped mass configured to have a plurality of arms extending from a central hub, wherein each of the consumption control pockets that are comprised of the controlled feed material are located between multiple arms.

4. The feed block of claim 1, wherein the pockets of the controlled feed material are defined between the intake control matrix and a container that holds both the intake control matrix and the controlled feed material.

5. The feed block of claim 1, wherein the intake control matrix of low moisture block material comprises a molded matrix filling in a void of similar shape formed in the controlled feed material, wherein the controlled feed material is held in a container.

6. The feed block of claim 2, wherein the controlled feed material in the container is present in a weight ratio relative to the low moisture block material that is greater than 1.5:1.

7. The feed block of claim 1, wherein the controlled feed material further comprises one or more additional feed supplement ingredients selected from the group consisting of mineral, vitamin, and medicine, wherein the intake control matrix is more palatable to an animal than the controlled feed material.

8. The feed block of claim 1, wherein the controlled feed material surrounds the intake control matrix.

9. The feed block of claim 1, wherein the intake control matrix is present in the feed block in an amount that occupies 7.5% to 40% of the total feed block weight and the controlled feed material in the feed block is present in a weight ratio relative to the low moisture block material that is in a range of 2:1 to 8:1.

10. A feed block for controlled consumption of animal feed by animals, comprising:

a first feed block portion which contains protein, comprising
a first shaped mass comprising first feed material in a first hardened form, wherein the first shaped mass comprises a first configuration at a top surface of the feed block,
wherein the first feed material comprises one or more feed supplement ingredients that contain the protein; and
a second feed block portion which contains molasses, comprising
a second shaped mass comprising a second feed material in a second hardened form,
wherein the second shaped mass is present in the feed block in an amount that occupies no greater than 40% of total feed block weight of the feed block,
wherein the second feed material comprises the molasses and has at least one different ingredient from the first feed material,
wherein the second shaped mass comprises a second configuration at the top surface of the feed block,
wherein the second shaped mass is positioned in and adjacent to the first shaped mass, and
wherein segments of the second configuration bound portions of the first configuration to define pockets comprising the first feed material adjacent the second feed material in the segments at the top surface of the feed block.

11. The feed block of claim 10, wherein the first configuration and the second configuration continue through different horizontal cross-sectional levels between the top surface of the feed block and a bottom surface of the feed block.

12. The feed block of claim 10, wherein the first configuration has a first configuration surface area and the second configuration has a second configuration surface area at the top surface and at additional horizontal cross-sectional levels between the top surface and a bottom surface of the feed block, wherein the first configuration surface area and the second configuration surface area are present in approximately the same proportion at different horizontal cross-sectional levels from the top surface to the bottom surface of the feed block.

13. The feed block of claim 12, further comprising a container with side walls and an open top, wherein the container holds the first feed block portion and the second feed block portion, wherein the top surface of the feed block is exposed from the open top of the container.

14. The feed block of claim 13, wherein the pockets of the first configuration are defined between the segments of the second configuration and the container.

15. The feed block of claim 10, wherein the second configuration comprises a plurality of arms extending from a central hub, wherein the arms bound portions of the first configuration to define the pockets that comprise the first feed material.

16. The feed block of claim 10, wherein the second shaped mass is present in the feed block in an amount that occupies 7.5% to 40% of the total feed block weight.

17. The feed block of claim 10, wherein the first shaped mass is present in a weight ratio relative to the second shaped mass in the feed block that is greater than 1.5:1.

18. The feed block of claim 10, wherein the first shaped mass is present in a weight ratio relative to the second shaped mass in the feed block that is in a range of 2:1 to 8:1.

19. The feed block of claim 10, wherein the first feed material further comprises one or more additional feed supplement ingredients selected from the group consisting of mineral, vitamin, and medicine.

20. The feed block of claim 1, wherein the hard block form comprises a compressed block form, chemical block form, or hybrid block form, wherein the compressed block form comprises a mass comprising the controlled feed material pressed into a hard block form, the chemical block form comprises a chemically-reacted mass comprising the controlled feed material in hardened block form, and the hybrid block form comprises a chemically-reacted mass comprising the controlled feed material pressed into a hard block form.

* * * * *